United States Patent [19]

Araseki

[11] 4,284,859
[45] Aug. 18, 1981

[54] ADAPTIVE ELECTRONIC HYBRID CIRCUIT

[75] Inventor: Takashi Araseki, Tokyo, Japan

[73] Assignee: Nippon Electric Company, Limited, Tokyo, Japan

[21] Appl. No.: 28,869

[22] Filed: Apr. 10, 1979

[30] Foreign Application Priority Data

Apr. 24, 1978 [JP] Japan ................................. 53/44496

[51] Int. Cl.³ .............................................. H04B 1/58
[52] U.S. Cl. ......................... 179/170 NC; 179/170 D
[58] Field of Search ....... 179/170 R, 170 NC, 170 D, 179/170 T, 170.2, 170.6, 170.8

[56] References Cited

U.S. PATENT DOCUMENTS

| | | | |
|---|---|---|---|
| 3,982,080 | 9/1976 | Ukeiley | 179/170 D |
| 4,096,361 | 6/1978 | Crawford | 179/170 D |
| 4,103,118 | 7/1978 | Bergman | 179/170 R |
| 4,174,470 | 11/1979 | Seidel | 179/170 NC |
| 4,181,824 | 1/1980 | Seidel | 179/170 NC |

*Primary Examiner*—John H. Wolff
*Assistant Examiner*—Randall P. Myers

*Attorney, Agent, or Firm*—Fitzpatrick, Cella, Harper & Scinto

[57] ABSTRACT

An adaptive hybrid circuit for connecting two-wire and four-wire telephone transmission lines to minimize singing, oscillation or echoes due to impedance mismatch. The circuit comprises a variable impedance circuit connected between the two-wire and four-wire circuits. In one embodiment one end of the variable impedance circuit is connected to the two-wire circuit and to one input of an adder to which the reception signal from the four-wire circuit is also applied and compared in reverse phase and half amplitude. The resulting transmission signal is used to adjust the variable impedance circuit so as to minimize the transmission signal. In another embodiment the variable impedance element is connected to an impedance through which the four-wire reception signal is applied and is further connected to one input of an adder which compares this input in reverse phase with the two-wire signal to produce a transmission signal. This transmission signal is also used to adjust the variable impedance circuit to minimize the transmission signal.

15 Claims, 12 Drawing Figures

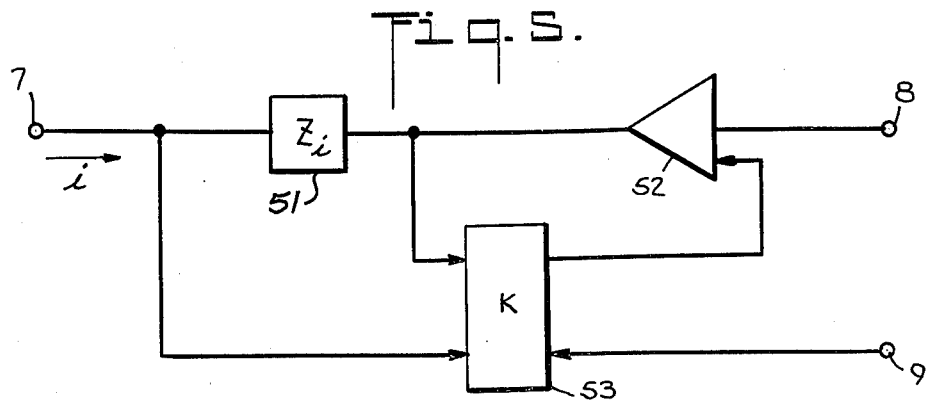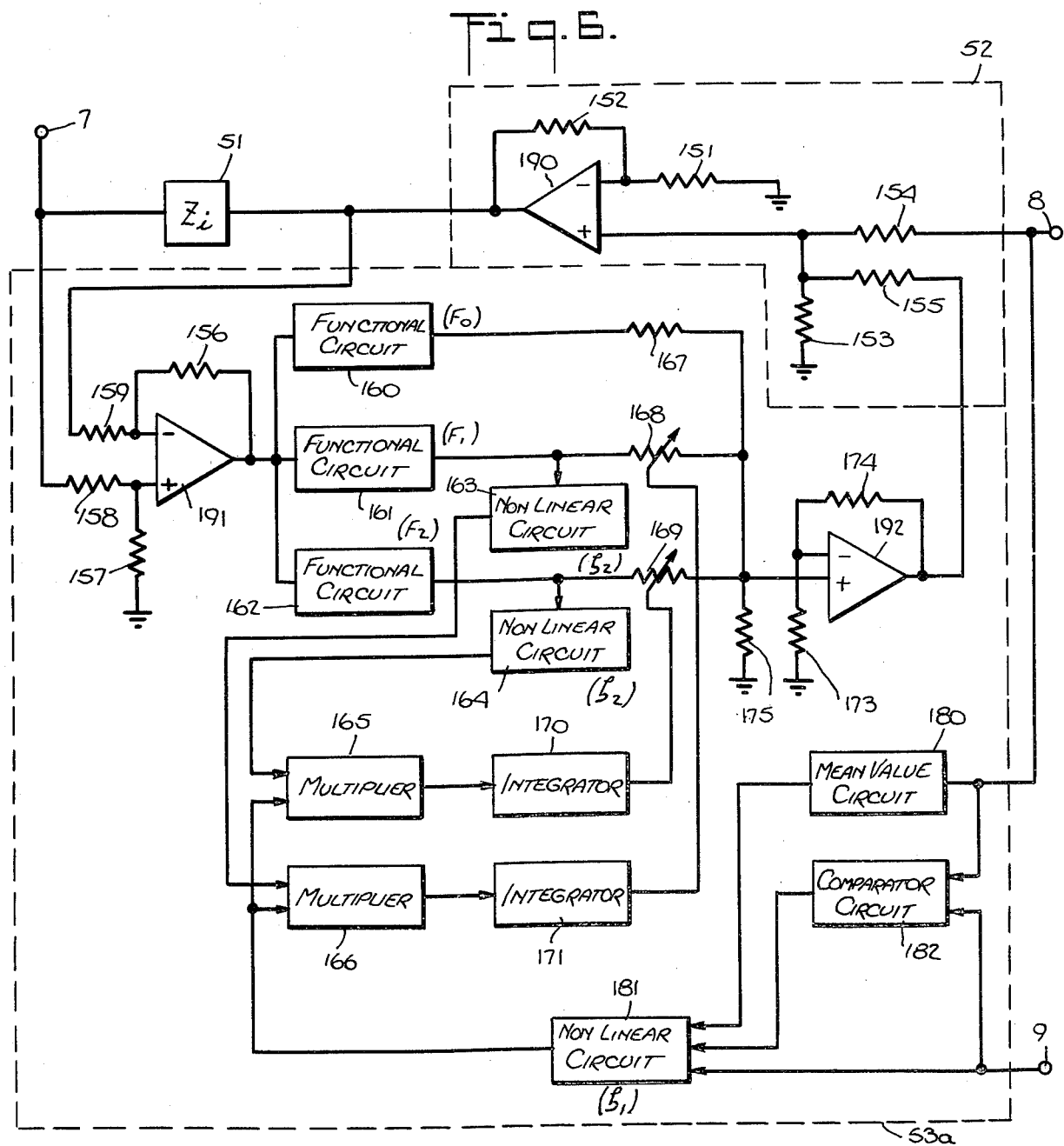

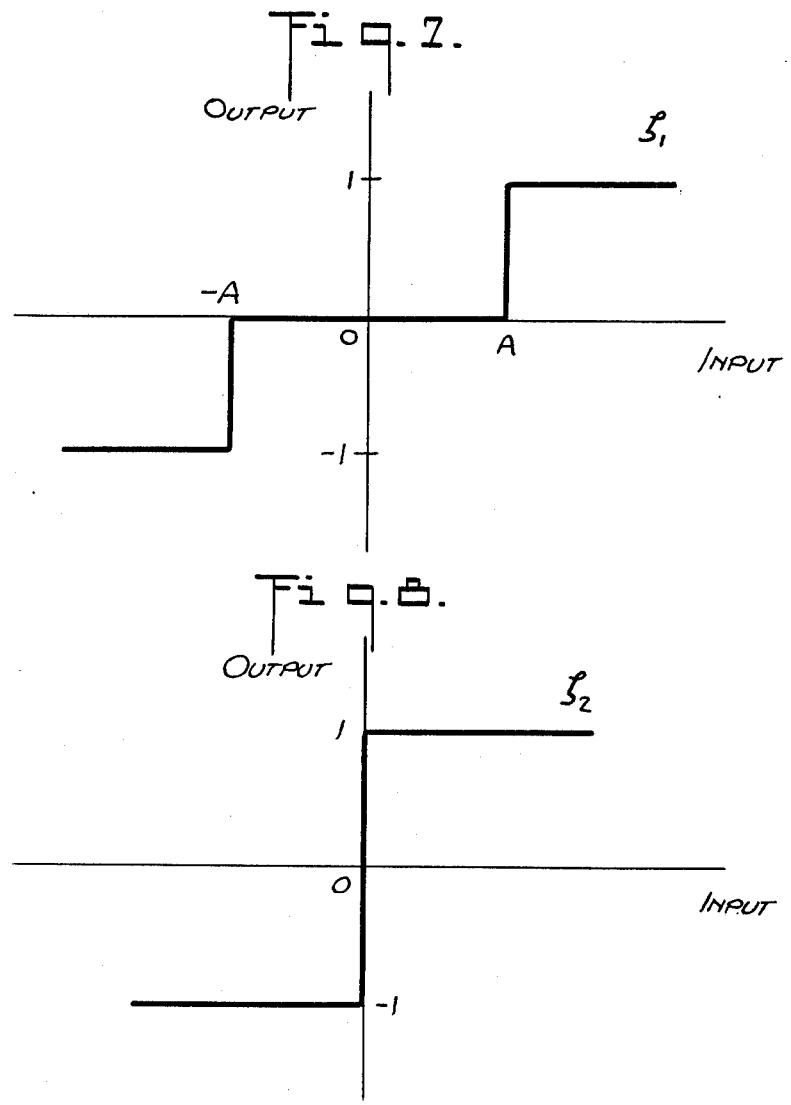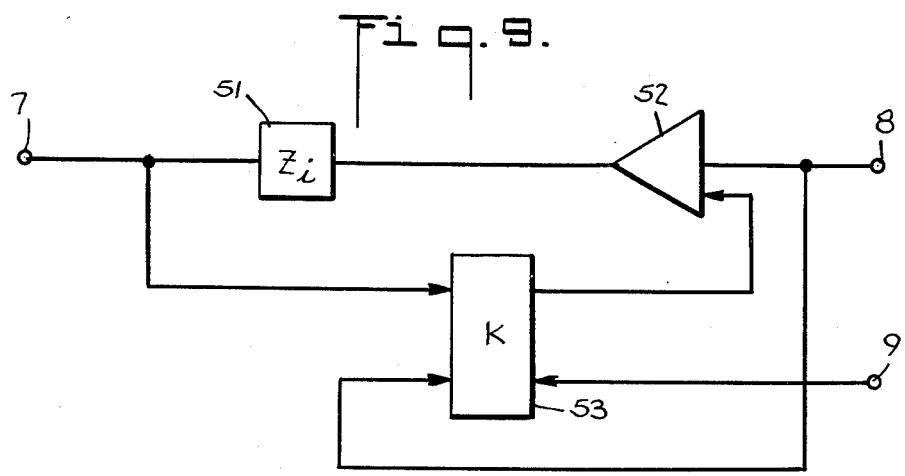

ADAPTIVE ELECTRONIC HYBRID CIRCUIT

BACKGROUND OF THE INVENTION

1. Field of the Invention

This invention relates to an adaptive electronic hybrid circuit for use in a two-wire to four-wire connection in a telephone transmission line.

2. Description of the Prior Art

A commercial telephone transmission line generally consists of a two-wire circuit in the vicinity of each subscriber and a four-wire circuit for long-distance link, with hybrid circuits used for connecting them.

A conventional hybrid circuit consists of a transformer as shown in FIG. 4 of the article titled "The Effects of Time Delay and Echoes on Telephone Conversations" by J. W. Emling et al. published in The Bell System Technical Journal (November issue 1963), pp. 2869–2891 (Reference 1).

On the other hand an electronic hybrid circuit has been proposed, in which an active element is used instead of a transformer. For details reference is made to FIG. 5 of the paper titled "DSS-1, A Digital Local Switching System with Remote Line Switches" by C. G. Svala published in National Telecommunication Conference 1977, pp. 39:5-1–5-7 (Reference 2).

These hybrid circuits, however, require the terminal impedance or the balance impedance to be well matched with the impedance of the two-wire circuit. Inadequate matching between these impedances, as is well known, results in such phenomena as singing, oscillation or echoes, each of which disturbs telephone conversation. Therefore, particular care should be taken in matching the terminal impedance. However, because the impedance of the two-wire circuit varies with its length and the terminal impedance at its other end, the impedances of two-wire circuits differ from one subscriber circuit to another. Accordingly, termination with a fixed impedance may result in considerable mismatching.

SUMMARY OF THE INVENTION

In accordance with one aspect of the present invention, an improved adaptive electronic hybrid circuit is provided for connecting a two-wire and a four-wire circuit. The hybrid circuit comprises an adaptive impedance circuit having a two-wire side and four-wire side for connection, respectively, to the two-wire circuit and the four-wire circuit. The adaptive impedance circuit has a variable impedance which is adaptively variable according to the impedance characteristics of the two-wire circuit. There is also provided an adder which adds, in a reverse phase, a half value of said reception signal on the four-wire side to the signals at the terminal of said two-wire circuit. This adder produces a sum which is supplied as a transmission signal on the four-wire side. A connection is also provided to apply the transmission signal to the adaptive impedance circuit so that an adaptive operation may take place by modification of the impedance of the adaptive circuit to minimize the transmission signal.

According to a further aspect of this invention, there is provided an adaptive electronic hybrid circuit for two-wire to four-wire connection, comprising an adaptive impedance circuit capable of adaptively modifying its impedance, a first impedance element for supplying a reception signal on the four-wire side to a terminal of the two-wire circuit, a second impedance element for supplying said reception signal on the four-wire side to said adaptive impedance circuit, an adder which adds, in a reverse phase, said reception signal appearing at the junction between said second impedance element and said adaptive impedance circuit to a signal from the terminal of said two-wire circuit to produce a transmission signal on the four-wire circuit and a circuit connected to apply the transmission signal to the adaptive impedance circuit so that an adaptive operation may take place by modification of the impedance of said adaptive circuit to minimize said transmission signal.

BRIEF DESCRIPTION OF THE DRAWINGS

The foregoing and other aspects and advantages of the present invention will be described in detail below with reference to the accompanying drawings in which:

FIG. 5 illustrates a first example of an adaptive impedance circuit for use in this invention;

FIG. 6 is a circuit diagram illustrating in further detail the adaptive impedance circuit of FIG. 5;

FIG. 7 is a graph representing a function $\zeta HD\,1$ used in the circuit of FIG. 6;

FIG. 8 is a graph representing a function $\zeta_2$ used in the circuit of FIG. 6;

FIG. 9 illustrates a second example of an adaptive impedance circuit for use in this invention;

Throughout the drawings, like reference numerals represent like structural elements.

DETAILED DESCRIPTION OF THE PREFERRED EMBODIMENTS

Figure 1:
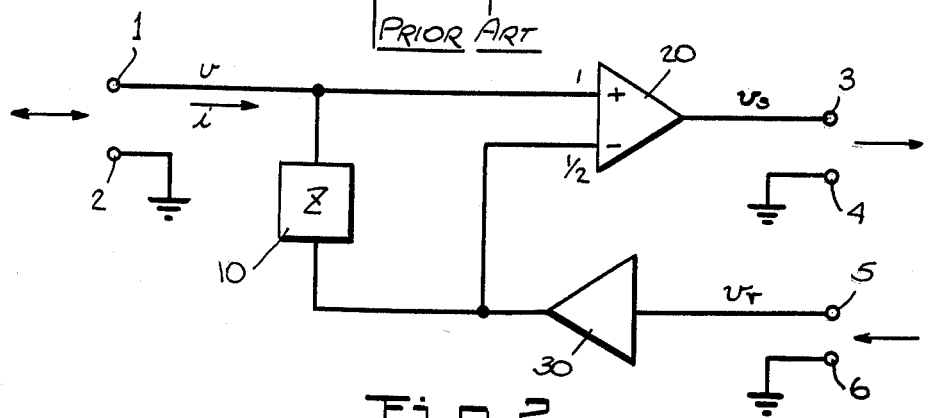
FIG. 1 illustrates an example of an electronic hybrid circuit of the prior art.

Referring to FIG. 1, an electronic hybrid circuit of the prior art is given a reception signal $v_r$ from an input terminal 5 on its four-wire side. The signal $v_r$ passes an amplifier 30 and an impedance element 10 and is supplied to one end of a two-wire circuit from a terminal 1. Reference numerals 2, 4 and 6 denote grounded terminals. Another signal v fed from the other end of the two-wire circuit passes an adder 20 and is transmitted from an output terminal 3 on the four-wire side. The reception signal $v_r$ is multiplied by a coefficient of $-\frac{1}{2}$ in the adder 20 and is added to the signal v of the two-wire circuit. If the impedance of the two-wire circuit matches the impedance of the element 10, only the signal fed from the other end of the two-wire circuit emerges as the output $v_s$ of the adder 20. However, since impedance matching tends to be inadequate as stated above, a considerable part of the reception signal $v_r$ on the four-wire side may leak out to the terminal 3.

Figure 2:
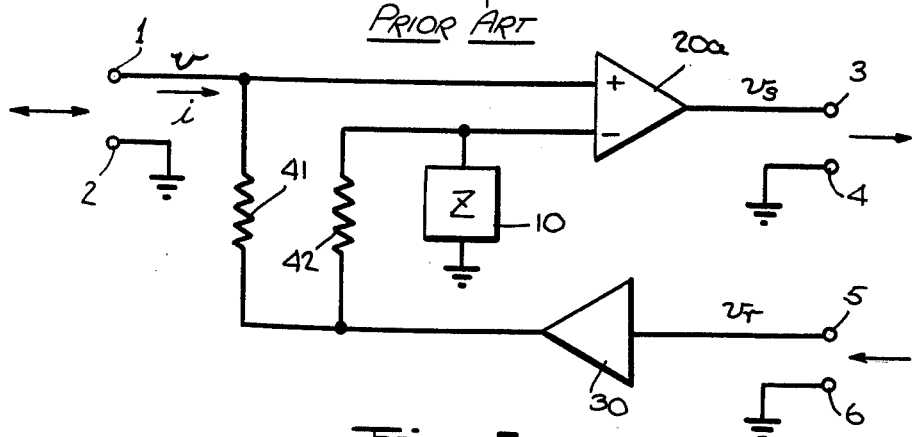
FIG. 2 illustrates another example of an electronic hybrid circuit of the prior art.

FIG. 2 illustrates another electronic hybrid circuit of the prior art corresponding to FIG. 5 of Reference 2. A reception signal $v_r$ on the four-wire side of the circuit is supplied at a terminal 5. This signal passes an amplifier 30, an impedance 41 and a terminal 1 to be supplied to the two-wire circuit; and at the same time this signal, after passing the impedance 41, is fed to an adder 20a. The reception signal $v_r$ on the four-wire side is also passed through an impedance 42 to the adder 20a which adds, in a reverse phase, these two input signals. Therefore, if the impedance of the two-wire circuit is equal to the balance impedance 10, the reception signal $v_r$ will not appear at an output terminal 3 of the adder 20a, but only the signal fed from the other end of the two-wire circuit appears at the output terminal 3 of the adder 20a. In a usual two-wire circuit, however, because impedance varies as stated above, the balance is disturbed, and as a result, the four-wire reception signal leaks out to the terminal 3. Besides, in general, the two wire circuit carries a high D.C. voltage for power supply or a large-amplitude A.C. voltage for ringing tone signals, and accordingly, highly voltage-resistant elements are needed. To avoid these disadvantages, the circuit structure of FIG. 2 is more frequently employed than that of FIG. 1.

Figure 3:
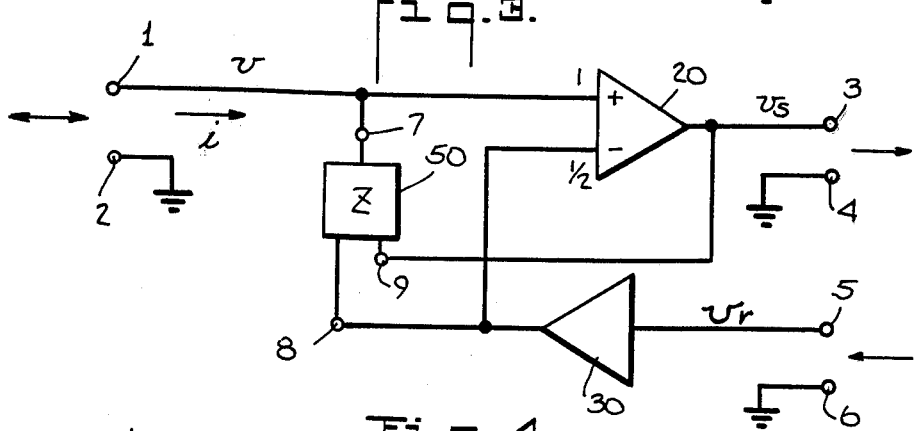
FIG. 3 is a diagram showing one embodiment of this invention.

Referring to FIG. 3, a first embodiment of the present invention is shown. As described with reference to FIG. 1, if the impedance of the two-wire circuit matches a terminal impedance circuit 10, no signal appears at a terminal 3 on the four-wire side in the presence of a four-wire reception signal $v_r$ alone.

If a signal $v_s$ emerges at the terminal 3, however, the signal $v_s$ is applied to an adaptive impedance circuit 50, so that an adaptive operation may take place to achieve better matching by modifying the impedance of the circuit 50 so as to minimize the power or amplitude of the signal $v_s$. If a signal is present at the other end of the two-wire circuit, no such modification is carried out and consequently the adaptive operation is stopped. It is thus possible to achieve matching between the impedance of the two-wire circuit and the terminal impedance while using all the signals which flow on the circuits, including speech signals, without using any additional signals such as signals for measuring the impedance of the two-wire circuit.

Since termination with the adaptive impedance, as in the case of this embodiment, results in decreased signal reflection from the two-wire circuit, the gain of a bilateral repeater used for amplification on the two-wire circuit can be greater than that in the prior art hybrid circuits.

Figure 4:
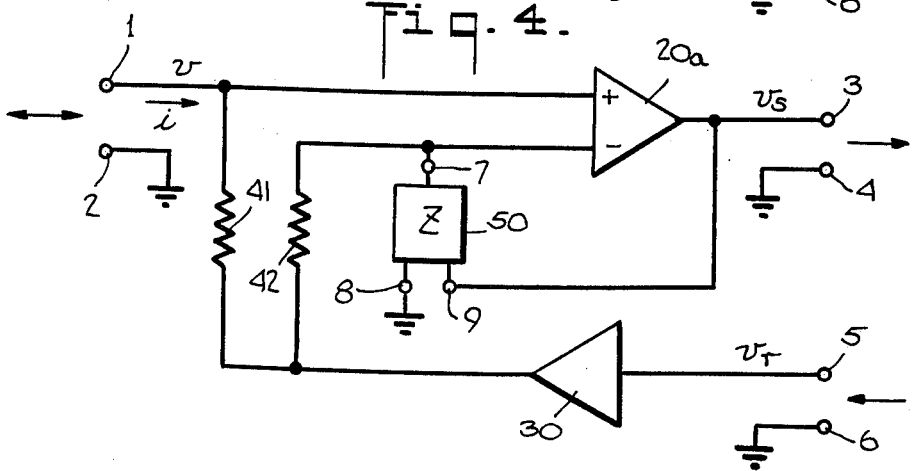
FIG. 4 is a diagram showing another embodiment of this invention.

Referring to FIG. 4, another embodiment of this invention includes the adaptive impedance circuit 50 in the general circuit arrangement of FIG. 2 for performing an adaptive operation to make the four-wire transmission signal $v_s$ smaller. As in FIG. 3 the signal $v_s$ is applied to the adaptive impedance 50.

Referring to FIG. 5, the adaptive impedance circuit for use in the embodiments of FIGS. 3 and 4 includes an impedance element 51 connected at one end to the terminal 7 and a control circuit 53 having a suitable transmission characteristic K to which is applied the voltage difference between the two ends of the impedance element 51. As shown, an adder 52 receives a signal from the terminal 8 and a signal from the control circuit 53 and applies the resulting summation signal to the other end of the impedance element 51. If the input impedance of the control circuit 53 is greater than the output impedance of same, the impedance Z between the terminal 7 and the ground is represented by the following equation:

$$Z = Z_i(1 + K) \tag{1}$$

In this instance, only the terminal 7, i.e., the impedance element 51, is connected to the two-wire circuit. A signal representing mismatching (the four-wire transmission signal $v_s$ in FIG. 3 or FIG. 4) is given from a terminal 9 to the control circuit 53 so that the circuit 53 modifies itself to minimize the signal $v_s$. The algorithm to minimize the power of the signal $v_s$ is obtained in the following manner.

In the circuit of FIG. 3, when no signal from the other end of the two-wire circuit appears, $$v_s = v - v_r/2 = \frac{Z - Z_L}{2} i \tag{2}$$

where $Z_L$ represents the impedance of the two-wire circuit. Assuming $Z_L = Z_i(1+L)$, from Equations (1) and (2), is derived $$v_s = \frac{K - L}{2} Z_i \cdot i \tag{3}$$

$Z_i \cdot i$ in Equation (3) corresponds to the potential difference between the two ends of the impedance element 51 in FIG. 5.

It is assumed that the transmission function K can be represented by a product obtained by multiplying a plurality of functions ($F_0, F_1, \ldots, F_{N-1}$) crossing one another at right angles by weights ($k_0, k_1, \ldots, k_{N-1}$), i.e., $$K = \sum_{j=0}^{N-1} k_j \cdot F_j \tag{4}$$

where N is an adequate value to bring the impedance of the two-wire circuit close to the terminal impedance. Here, partial differentiation of $(v_s)^2$ with $k_j (j=0, 1, \ldots N-1)$ to make $(v_s)^2$ small gives $$\frac{\partial}{\partial k_j}(v_s)^2 = 2v_s \cdot F_j \cdot Z_i \cdot i \tag{5}$$

It is thus found that the following relationship has eventually to be achieved:

$$k_j^{NEW} = k_j^{OLD} - g \cdot v_s \cdot F_j \cdot Z_i \cdot i \tag{6}$$

where g is a value sufficiently smaller than 1 and $F_j \cdot Z_i \cdot i$ represents the result of having a signal $Z_i \cdot i$ go through the function F. Equation (6) can be transformed into:

$$k_j^{NEW} = k_j^{OLD} - \Delta \cdot \zeta_1(v_s)\zeta_2(F_j \cdot Z_i \cdot i) \tag{7}$$

where $\zeta_1$ and $\zeta_2$ are non-decreasing functions and delta $\Delta$ is a positive number sufficiently smaller than 1.

Referring to FIG. 6 which illustrates in further detail the first embodiment based on Equation (7), the potential difference between the two ends of the impedance element 51 is obtained by an adder circuit having an operational amplifier 191 with input resistors 157, 158 and 159 and a feedback resistor 156, which is given to attenuators 167, 168 and 169 through functional circuits 160, 161 and 162. The outputs of the attenuators 167, 168 and 169 are fed to an operational amplifier 192 and a number of resistors 173, 174 and 175. As a result, a signal $v_r$ given from a terminal 8 and the output of the operational amplifier 192 is added in an adder 52 so that the sum of the adder 52 may be given to the impedance element 51. The adder 52, as shown, comprises an operational amplifier 190 having one input grounded through a resistor 151, a feedback connection via a resistor 152 to the one input and a second input to which signals from the operational amplifier 192 are applied through a resistor 185 and to which signals from the terminal 8 are applied through a resistor 154. A resistor 153 connects the second input terminal of the operational amplifier 190 to ground. Although in FIG. 6 the weighting coefficient of the signal having passed the functional circuit 160 is constant, the weighting coefficients $k_j$ for the signal having passed the functional circuits 161 and 162 are controlled. The weighting coefficients $k_j$ are obtained by nonlinear circuits 163 and 164 giving $\zeta_2$, another nonlinear circuit 181 giving $\zeta_1$, multipliers 165 and 166 calculating the products thereof and integrators 170 and 171 whose outputs adjust the attenuators 168 and 169.

When the functions $\zeta_1$ and $\zeta_2$ can be represented by the graphs of FIGS. 7 and 8, respectively, the multipliers only have to multiply different combinations of +1, 0 and −1, simplifying their circuit structures. Reference letter A in FIG. 7 represents a value smaller by a certain difference than the root-mean-square value of the four-wire reception signal $v_r$ or some other value related thereto, which is obtained by a mean value circuit 180. When the introduction of the value A has resulted in the approach of the impedance Z to the impedance of the two-wire circuit to some extent and in the diminution of the signal $v_s$, the modification of the weighting coefficient $k_j$ is suspended. Also, if the level of the signal $v_s$ has surpassed that of the signal $v_r$, then a signal from the other end of the two-wire circuit will cause a comparator circuit 182 to give an instruction to make the output of the nonlinear circuit 181 zero so as to suspend the impedance modifying procedure.

The functional circuits 160 through 162 of FIG. 6 may be integrators, differentiators, or transversal filters using delay circuits. In the last instance, a number of delay circuits can be connected in cascade, with their outputs corresponding to the outputs of the functional circuits 160 through 162. While it may be assumed that the weighting coefficient for the functional circuit 160 in FIG. 6 is known in advance, if it should prove difficult to predetermine the weighting coefficient, the attenuator 167 can be controlled to vary said coefficient.

Each of the elements shown in block form in FIG. 6 is conventional. The functional circuits 160, 161 and 162 and the integrators 170 and 171 each may comprise an integrator of the type disclosed in FIG. 7-2, page 274 of the book entitled "Analog Computation" by Albert S. Jackson, McGraw-Hill Book Company, Inc., 1960. The nonlinear circuits 163 and 164 having the function $\zeta_2$ of FIG. 8 and the comparator circuit 182 each may comprise a comparator such as that denoted by the numeral 60 in FIG. 1 of U.S. Pat. No. 3,725,585 or they may comprise an analog voltage comparator such as comparator LM 311 disclosed in a publication entitled "Signetics Logic Memories Interface Analog Microprocessor Military Data Manual" published in 1976 by Signetics Corporation. The nonlinear circuit 181 having the function $\zeta_1$ of FIG. 7 may comprise a pair of such comparators having thresholds (−A) and (A) and connected in parallel. Further, the mean value circuit 180 may comprise a rectifier connected to and followed by a low pass filter.

The structure of FIG. 6 makes possible simplification and integration of circuit components, and consequently provides a substantial cost reduction.

Although description of FIG. 6 refers to the embodiment of FIG. 3 based on Equation (7), the same effect can be expected from the use of the embodiment of FIG. 4.

Referring to FIG. 9, another adaptive impedance circuit for use in this invention has the following impedance Z between a terminal 7 and the ground:

$$Z = Z_i/(1-K) \qquad (8)$$

From $v_s = v - v_r/2$ is derived $$v_s = \frac{Z_L - Z}{2Z}(v - v_r)$$

If the impedance of the two-wire path can achieve the optimum approximation at $Z_L = Z_i/(1-L)$, $$v_s = \frac{L - K}{2(1 - L)}(v - v_r) \qquad (9)$$

If L is sufficiently smaller than 1, a control circuit 53 can be similarly structured to what is illustrated in FIGS. 4 and 5, except that the subtraction in Equation (7) for weighting coefficient modification should be replaced by an addition.

If L is not negligibly small as compared with 1, from $v_s = v - v_r/2$ is derived $$v_s = \frac{L - K}{2(1 - k)}v \qquad (10)$$

If the amperage of the current which flows when $v_s$ is fed to a terminal 7 of the adaptive impedance circuit 50 of FIG. 9 is represented by $i_s$, $$v_s = i_s \cdot Z_i/(1-K) \qquad (11)$$

Hence, Equation (10) can be transformed into $$i_s \cdot Z_i = \frac{L - K}{V}v \qquad (12)$$

where $i_s \cdot Z_i$ represents the voltage at both ends of the impedance $Z_i$. For the algorithm to minimize $i_s \cdot Z_i$, as is the case with the first embodiment, a modified algorithm of $$k_j^{NEW} = k_j^{OLD} + g \cdot i_s \cdot Z_i \cdot F_j \cdot v \qquad (13)$$

is obtained in a manner similar to that for obtaining Equation (6), and further to simplify arithmetic operations, this equation, like Equation (7), can be transformed into $$k_j^{NEW} = k_j^{OLD} + \Delta\zeta_1(i_s \cdot Z_i)\zeta_2(F_j \cdot v) \qquad (14)$$

Figure 10:
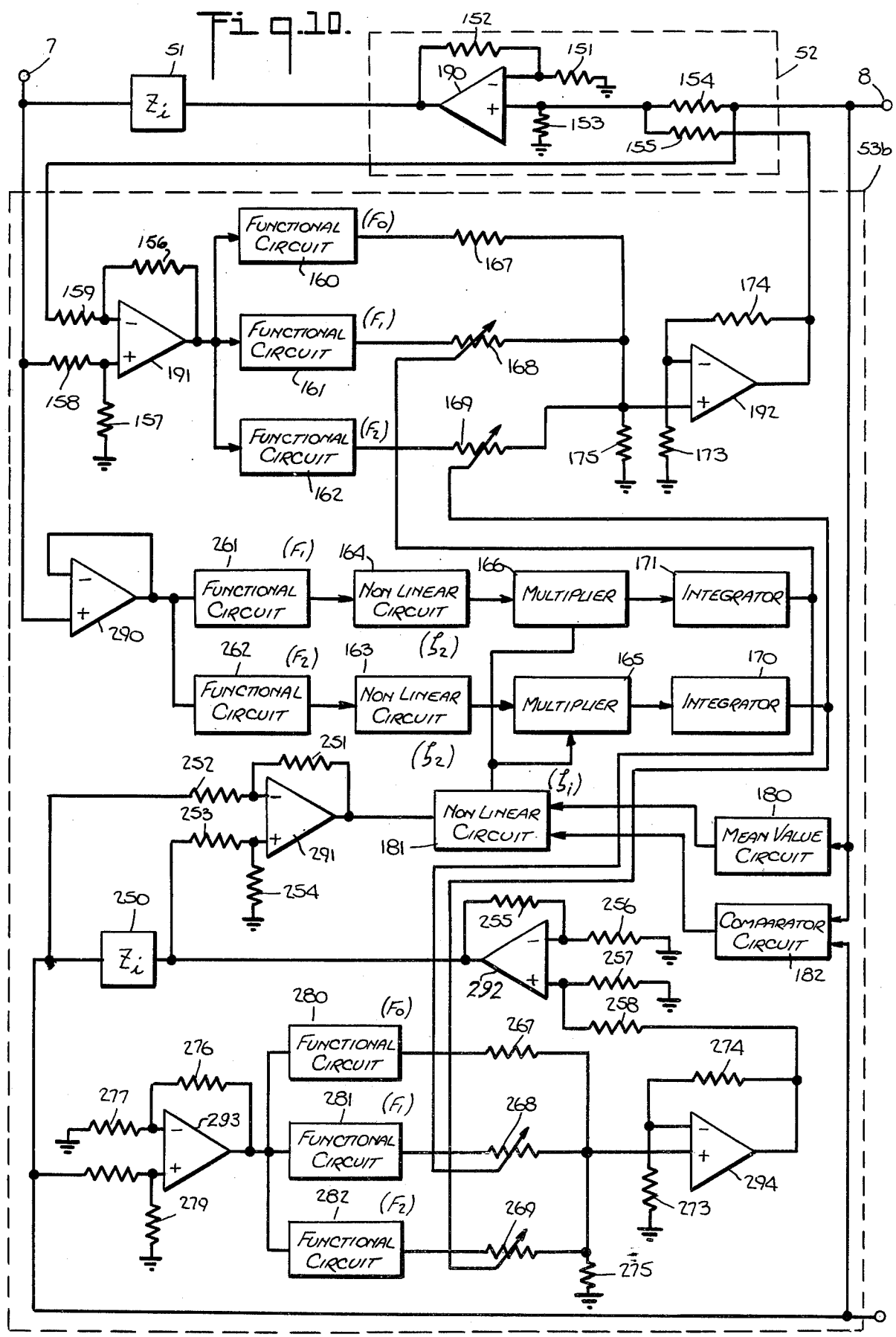
FIG. 10 illustrates in further detail the adaptive impedance circuit of FIG. 9.

FIG. 10 illustrates in detail the adaptive impedance circuit of FIG. 9 based on Equation (14). In FIG. 10, the attenuators 168 and 169 and attenuators 268 and 269 are controlled, as is obvious from Equation (14), by the use of signals v and $i_s \cdot Z_i$. The principal part of circuit of FIG. 10 is composed of a loop comprising an impedance element 51 and operational amplifiers 190 through 192. The signal v (from a terminal 7) passes an operational amplifier 290 and then functional circuits 261 and 262, and is applied to nonlinear circuits 163 and 164. A signal $v_s$ from a terminal 9 is fed to another impedance element 250 like the impedance element 51. A loop comprising the impedance element 250 and operational amplifiers 292, 293 and 294 with their associated input and feedback resistances 276–279, 255–258 and 273–275 has the same impedance as the loop involving the impedance element 51. Likewise, each of the structural elements associated with this loop having the impedance element 250 including functional elements 280, 281 and 282 and attenuators 267, 268 and 269 has the same function as the corresponding elements in the loop having the element 51. Accordingly, the potential difference between the two ends of the impedance element 250 is $i_s \cdot Z_i$. The signal $i_s \cdot Z_i$ is fed to the nonlinear circuit 181, and modification is achieved in the same manner as in the first embodiment.

Figure 11:
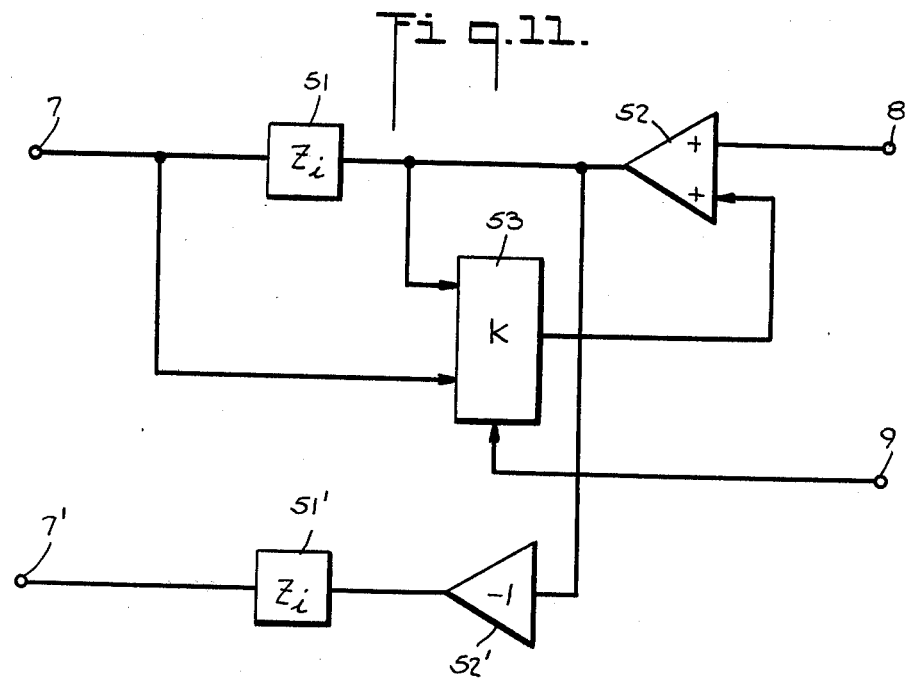
FIG. 11 illustrates a third example of an adaptive impedance circuit for use in this invention.
Figure 12:
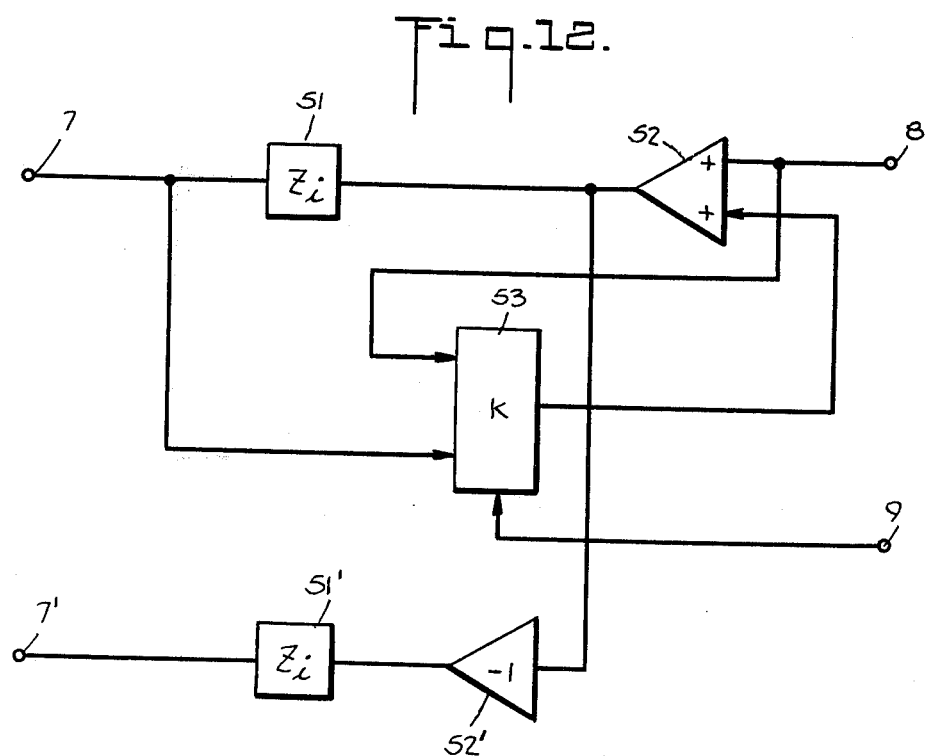
FIG. 12 illustrates a fourth example of an adaptive impedance circuit for use in this invention.

Referring to FIGS. 11 and 12, still another adaptive impedance circuit adaptable for a balanced two-wire circuit has terminals 7 and 7' connected to the balanced two-wire circuit. In these structural examples, only a inverter 52' and an impedance element 51' are employed in addition to the other elements of the above described adaptive circuits. The adaptive impedance circuits illustrated in FIGS. 5 and 9, may also be combined, i.e., they may be used in a structure in which the voltages at the terminals 7 and 8 are applied to an adaptive control circuit and the voltages at the two ends of the impedance element 51 are applied to another adaptive control circuit so that each control circuit can be adaptively modified.

As herein described, the present invention makes it possible to integrate circuits in a simple structure and realize adaptive electronic hybrid circuits with little reflection from all the two-wire and four-wire circuits.

I claim:

1. An adaptive electronic hybrid circuit comprising a two-wire terminal for connection to a two-wire circuit, a reception terminal for connection to receive signals from a four-wire circuit and a transmission terminal connected to transmit signals to said four-wire circuit, an adaptive impedance circuit having first, second and third terminals, said adaptive impedance circuit having variable internal impedance characteristics which can be adaptively varied to correspond to the impedance characteristics of said two-wire circuit, an adder connected to add in reverse phase a half value of a reception signal from said reception terminal to a signal from said two-wire terminal to produce a transmission signal on said transmission terminal, said first terminal of said adaptive impedance circuit being connected to said two-wire terminal, said second terminal of said adaptive impedance circuit being connected to said reception terminal and said third terminal of said adaptive impedance circuit being connected to the output of said adder, said adaptive impedance circuit being operative in response to the reception of a signal from said adder which is less than said reception signal to change the impedance of said adaptive impedance circuit to minimize said transmission signal.

2. An adaptive electronic hybrid circuit comprising a two-wire terminal for connection to a two-wire circuit, a reception terminal for connection to receive signals from a four-wire circuit and a transmission terminal connected to transmit signals to said four-wire circuit, a first impedance element for supplying a reception signal from said reception terminal to said two-wire terminal, an adaptive impedance circuit having first, second and third terminals, said adaptive impedance circuit having variable internal impedance characteristics which can be adaptively varied to correspond to the impedance characteristics of the two-wire circuit, a second impedance element for supplying said reception signal to said first terminal of said adaptive impedance circuit, an adder connected to add in reverse phase the reception signal delivered at said first terminal to a signal from said first impedance element to produce a transmission signal at said transmission terminal, the second terminal of said adaptive impedance circuit being connected to ground, the third terminal of said adaptive impedance circuit being connected to receive the output of said adder, said adaptive impedance circuit being operative in response to the reception of a signal from said adder which is less than said reception signal to change the impedance of said adaptive impedance circuit to minimize said transmission signal.

3. An adaptive hybrid circuit according to claim 1 or claim 2, wherein there is provided comparison means to compare said transmission signal and the received signal on the four-wire side and to prevent modification of impedance when said transmission signal exceeds said received signal.

4. An adaptive electronic hybrid circuit according to claim 1 or 2 wherein said adaptive impedance circuit comprises an impedance element connected between said first and second terminals, and a control circuit connected to receive, as an input signal, a signal corresponding to the current through the impedance element, said control circuit having a connection to said third terminal to receive signals therefrom, and having an output which controls the driving of said impedance element whereby the impedance characteristics of said adaptive circuit are changed to minimize said transmission signal.

5. An adaptive hybrid circuit as claimed in claim 4 wherein said adaptive impedance circuit additionally comprises a fourth terminal and a second impedance element which is connected to said fourth terminal; said control circuit being connected to drive said first impedance element and said second impedance element in opposite phase to modify the impedance characteristics thereof.

6. An adaptive electronic hybrid circuit according to claim 4 wherein said adaptive impedance circuit further includes a summing amplifier whose output is connected to said impedance element, said summing amplifier having its inputs connected, respectively, to said second terminal and to the output of said control circuit.

7. An adaptive electronic hybrid circuit according to claim 6 wherein said control circuit comprises a plurality of adjustable weight functional circuits to each of which said input signal is applied, said functional circuits being constructed to pass functions of said input signal which cross each other at right angles, said functional circuits each including adjustable attenuators, means for selectively adjusting said attenuators in response to signals at said third terminal, means for combining the outputs of said functional circuits and means for applying the combined outputs to one input of said summing amplifier.

8. An adaptive electronic hybrid circuit according to claim 7 wherein said means for selectively adjusting said attenuators comprises a nonlinear circuit for receiving signals from said second and third terminals and for producing an output when the signal at said third terminal is greater than a predetermined amplitude but less than the amplitude of the signal at said second terminal, the output of said nonlinear circuit being connected to integrators whose outputs, in turn, are connected to control the adjustment of said attenuators.

9. An adaptive electronic hybrid circuit according to claim 8 wherein the output of said nonlinear circuit is combined in multipliers with outputs of further nonlinear circuits connected respectively to said functional circuits to produce signals for application to associated ones of said integrators.

10. An adaptive electronic hybrid circuit according to claim 1 of 2 wherein said adaptive impedance circuit comprises an impedance element connected between said first and second terminals, and a control circuit connected to receive, as an input signal, the voltages at the first and second terminals, said control circuit having a connection to said third terminal to receive signals therefrom, and having an output which controls the driving of said impedance element whereby the impedance characteristics of said adaptive circuit are changed to minimize said transmission signal.

11. An adaptive hybrid circuit as claimed in claim 10 wherein said adaptive impedance circuit additionally comprises a fourth terminal and a second impedance element which is connected to said fourth terminal, said control circuit being connected to drive said first impedance element and said second impedance element in opposite phase to modify the impedance characteristics thereof.

12. An adaptive electronic hybrid circuit according to claim 10 wherein said adaptive impedance circuit further includes a summing amplifier whose output is connected to said impedance element, said summing amplifier having its inputs connected, respectively, to said second terminal and to the output of said control circuit.

13. An adaptive electronic hybrid circuit according to claim 12 wherein said control circuit comprises a plurality of adjustable weight functional circuits to each of which said input signal is applied, said functional circuits being constructed to pass functions of said input signal which cross each other at right angles, said functional circuits each including adjustable attenuators, means for selectively adjusting said attenuators in response to signals at said third terminal, means for combining the outputs of said functional circuits and means for applying the combined outputs to one input of said summing amplifier.

14. An adaptive electronic hybrid circuit according to claim 13 wherein said means for selectively adjusting said attenuators comprises a nonlinear circuit for receiving signals from said second and third terminals and for producing an output when the signal at said third terminal is greater than a predetermined amplitude but less than the amplitude of the signal at said second terminal, the output of said nonlinear circuit being connected to integrators whose outputs, in turn, are connected to control the adjustment of said attenuators.

15. An adaptive electronic hybrid circuit according to claim 14 wherein the output of said nonlinear circuit is combined in multipliers with outputs of further nonlinear circuits connected respectively to said functional circuits to produce signals for application to associated ones of said integrators.

* * * * *